Feb. 19, 1963   S. A. MASON   3,078,437
WIRING DEVICE
Filed July 10, 1959   2 Sheets-Sheet 1

WITNESSES:
Bernard R. Gieguay
E. F. Possesky

INVENTOR
Stuart A. Mason
BY
Donald G. Smith
ATTORNEY

United States Patent Office 3,078,437
Patented Feb. 19, 1963

3,078,437
WIRING DEVICE
Stuart A. Mason, Huntington, Conn., assignor to Westinghouse Electric Corporation, East Pittsburgh, Pa., a corporation of Pennsylvania
Filed July 10, 1959, Ser. No. 826,266
3 Claims. (Cl. 339—164)

The present invention relates to electrical wiring devices, and more particularly to receptacles that serve to interconnect electric plugs with electric conductors for the transfer of electric energy therebetween.

In order to employ gainfully electric energy, it must be controllably transmitted to utilizing apparatus. Thus, the transmission of electric energy is accomplished through the use of conducting mediums ordinarily in the form of wires, and the transmission is controlled by wiring devices that can serve to establish or disestablish connections between successive wires. Such wiring devices ordinarily have been designed to accord with electrical and mechanical performance and safety requirements, and efforts along these lines have resulted in a variety of wiring devices adapted for a variety of functions consistent with commercially acceptable prices.

Increased costs of manufacturing manpower, in a commercial market not susceptible to increased prices for products of manufacture, have contributed to a continuing and extended need for economic mechanized fabrication and assembly of wiring devices having a minimum number of component parts. To satisfy adequately this need and the concurrent and often opposing need for meeting electrical and mechanical safety and performance standards, creative efforts are necessarily employed in the design of wiring devices.

Thus, it is an object of the invention to provide a novel wiring device that comprises a minimum number of components while satisfying electrical and mechanical performance and safety standards.

It is another object of the invention to provide a novel wiring device having an integral housing that readily receives terminal and mounting means so that the wiring devices can be rapidly assembled.

It is a further object of the invention to provide an electrical receptacle having an integral housing that readily receives terminal and mounting means to form the receptacle so that electrical and mechanical performance and safety standards are satisfied.

These and other objects of the invention will become more apparent upon consideration of the following detailed description of an illustrative embodiment of the invention in relation to the accompanying drawings, in which.

Figure 1:
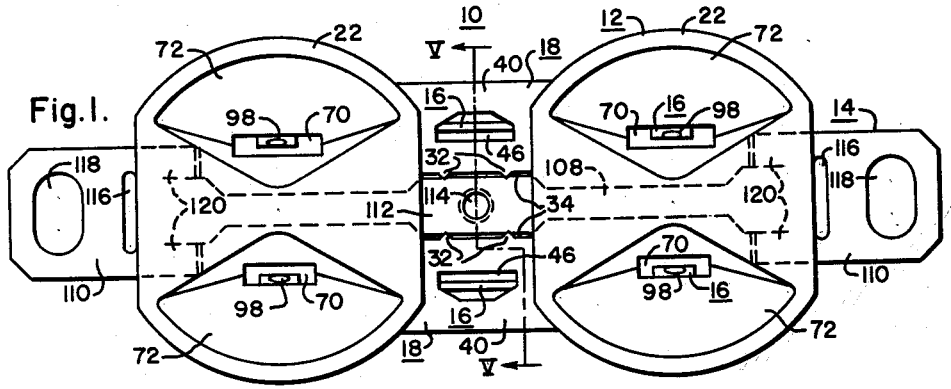
FIGURE 1 is a top plan view of an assembled electrical receptacle constructed in accordance with the principles of the invention.

In accordance with the broad principles of the invention, a wiring device comprises an integral housing that receives and readily supports novel terminal means and mounting means so that intended electrical and mechanical functions can be fulfilled. Thus, the number of component parts for the wiring device are minimized in that separate fastening means for the wiring device are not required thereby inherently providing for rapid assembly.

Although the illustrated electrical receptacle will be described to point out the invention, other wiring devices having modified structures can equivalently be constructed in accordance with the principles of the invention. Accordingly, with reference to FIGS. 1, 2 and 3, an electrical receptacle 10 comprises a housing member 12, a mounting member or yoke 14, and terminal members 16. The housing 12 is integrally molded from a material having insulative and mechanical properties suitable for whatever use is to be made of the receptacle 10. In any employment, the housing 12 mechanically supports the terminal members 16 and electrically insulates these terminals from each other.

The formed housing 12 includes two elongated, terminal receiving piers 18 having a channel 20 therebetween. The piers 18 are spanned by frontally or forwardly located faced portions 22 that can support electrical plugs (not shown) having prongs for insertion in the receptacle 10. Because two faced portions 22 are provided, the receptacle 10 is accorded a duplex character.

Since the piers 18 and the faced portions 22 are respectively identical, a description of the structure of one of the piers 18 and one of the faced portions 22 will suffice to point out the structure of the integral housing 12. To continue in view of this consideration, the elongated pier 18 is formed substantially as a rectangular parallelepiped and includes a terminal receiving chamber 24 which has an open rearwardly facing side for terminal insertion.

A side wall 26, an opposite side wall 28, and oppositely stationed end walls 30 irregularly circumscribe the chamber 24. The side wall 26 has elongated, V-projecting ridges 32 for contribution to the engagement of the mounting member 14 in a manner to be described hereinafter. Additionally, a recessed middle portion 34 in the side wall 26 is provided for reception of a complementarily formed portion of the mounting member 14 in a manner which will also become more apparent as the description continues. Each of the end walls 30 additionally has elongated, V-projecting ridges 36 for substantial contribution to the engagement of the mounting member 14. A longitudinally tapered portion 38 on each of the ridges 36 facilitates sliding the mounting member 14 to a uniformly raised ridge portion 37. On the other hand, the ridges 32 uniformly extend along the side wall 26 and are raised an amount to offer only nominal frictional restraint to the passage of the mounting member 14 thereover. It is not intended, however, that the distribution nor the amount or shape of the projection of the mentioned ridges be a limiting feature of the invention.

To continue with the description of the pier 18, the chamber 24 is topped in a horizontal plane by a roof 40. The roof 40 includes wire receiving recesses 42, terminal supporting ledges 44, and openings 46 that enable single-operation molding for the housing 12. The inner surface of each of the end walls 30 is formed to provide a terminal supporting, vertically extending ledge 48. The particular mechanical relationships between an inserted terminal 16 and the mentioned terminal supporting and engaging portions within the chamber 24 will be more fully described hereinafter.

With further reference to the pier chamber 24, the inner surface of the side wall 26 is formed to provide vertically extending ridges 50 for the support of conductive prongs associated with the aforementioned electrical plug when inserted into the receptacle 10. Also, vertically extending pillars 52 define cubicles 54 for reception, in part, of wire releasing means, and horizontal ledges 56 extend between the pillars 52 so that movement of a wire engaging portion of the terminal 16 is limited under wire releasing action, a more thorough description of which will be presented hereinafter. The inner surface of the side wall 26 is formed to provide additionally a terminal supporting platform 58.

In general, the inner surface of the opposite side wall 28 is formed to cooperate with the inner surface of the side wall 26 for reception of the terminal 16 in the chamber 24. Thus, the inner surface of the opposite side wall 28 is formed to provide vertically extending, terminal supporting ridges 60, wire receiving cubicles 62 bounded in part by vertical partition pillars 64 with a horizontal ledge 65 for the positioning of a terminal wire engaging means, and a terminal supporting platform 66 having a terminal engaging, hook-like projection 68.

As shown most clearly in FIG. 1, the previously mentioned faced portions 22 integrally span the pair of piers 18. The aforementioned electrical plugs can be inserted in the receptacle 10 through slots 70 provided at the foot of recesses 72 in the top of each of the faced portions 22. The particular appearance effected by the design of the faced portions 22 is one that blends with contemporary motifs, while the general structure is one that mechanically supports the plugs and electrically insulates their conductive prongs.

Figure 7:
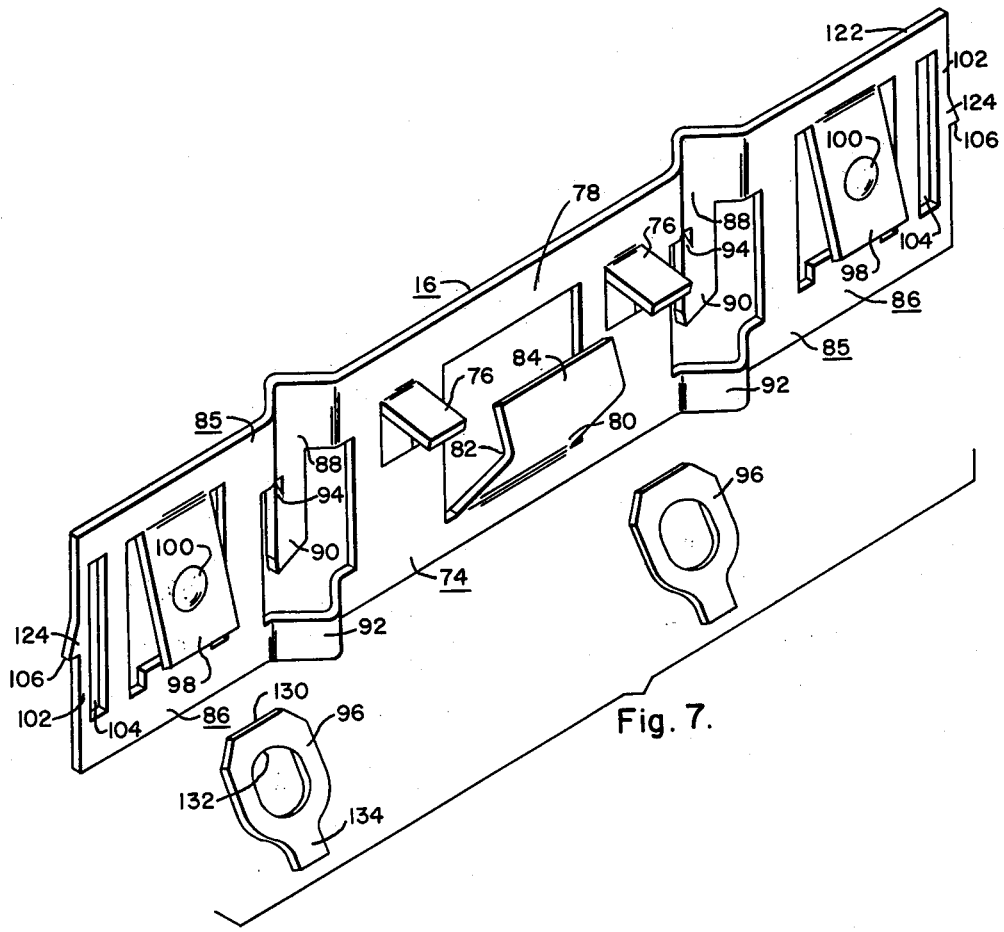
FIG. 7 is an isometric view of a terminal member adapted for insertion into the housing shown in FIG. 2.

With reference to FIG. 7, the terminal 16 is generally constructed so that the intended electrical function of the receptacle 10 can be accomplished. Thus, the terminal 16 is structurally adapted to be supported in the housing 12 and thereupon provide means for electrically engaging conductive wires and plug prongs. When the plug prongs and the wires are respectively engaged, an electrical connection is made therebetween in that the terminal 16 is made of electrically conductive material. The terminal material is additionally characterized by a resiliency suitable for meeting the engaging functions of the terminal 16.

More particularly, the terminal 16 is elongated in order to conform to the elongated channels 24 in the housing 12. A terminal middle portion 74 has means for stabilizing and clamping the terminal 16 within a pier 18 of the housing 12. Specifically, rearwardly extending lanced or struck-out cantilever tabs 76 and a struck-out forwardly extending resilient flap 80 that elbows, as indicated by the reference character 82 so that a forearm 84 extends inwardly therefrom, cooperate to stabilize and clamp the terminal 16 when inserted in either pier 18. A strip 78 cooperates with the previously mentioned pier hook-like projection 68, when the terminal 16 is forwardly inserted in one of the piers 18, to lock the terminal 16 in its inserted position in a manner described more fully hereinafter. Both the tabs 76 and the flap 80 are located rearwardly of the strip 78.

Portions 85 intermediate to end portions 86 and the middle portion 74 of the terminal 16 are constructed to engage automatically wires positioned therein. Wire receiving lugs 88 extend outwardly from the terminal 16 so that an arm 90 of each lug 88 is offset in a plane substantially parallel to the plane of the terminal 16. A tang 94 projects from each arm 90 in order to limit movement, beyond certain tolerances, of a wire engaging clip 96 along the arm 90 when the clip 96 is positioned on the arm 90. In addition, wire guiding strips 92, similarly, but oppositely from the lugs 88, extend from the terminal portions 85. The wire engaging operation of the mentioned elements of each of the terminal portions 85 will be described hereinafter.

Each end portion 86 includes a cantilever plug engaging contact 98 having a dome-like bump 100 for restraining the release of an engaged plug prong in an assembled receptacle when, for example, random vibrations occur. Additionally, resilient end beams 102, each having a tang 106, are adjacent to slots 104 to provide for flexible insertion of the terminal 16 in the housing 12.

Figure 2:
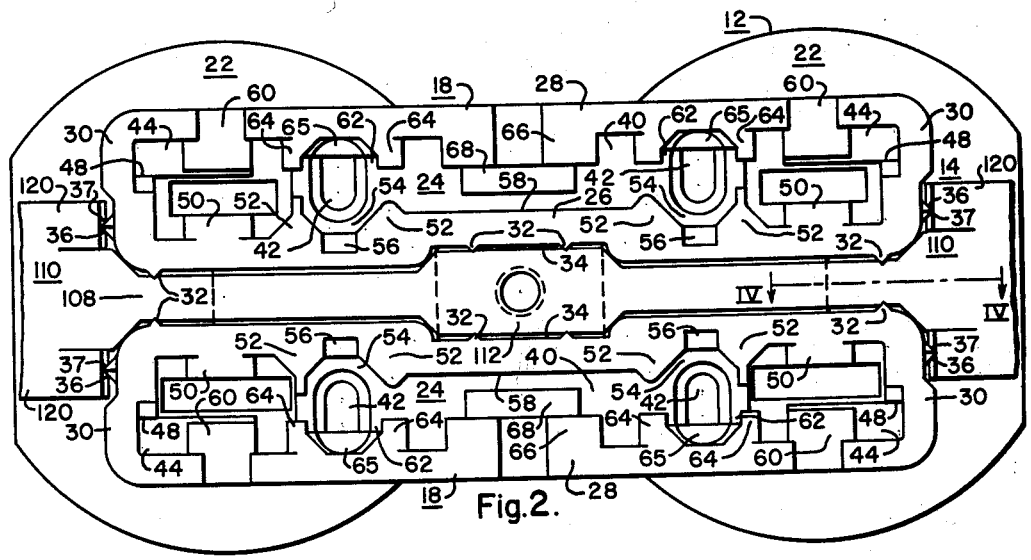
FIG. 2 is a bottom plan view of a housing and a mounting member for the receptacle shown in FIG. 1.
Figure 3:
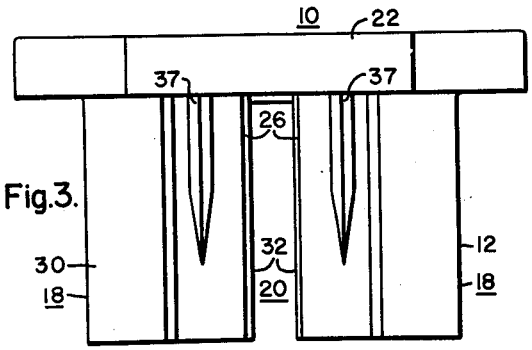
FIG. 3 is an end elevational view of the receptacle shown in FIG. 1 with a yoke member thereof being removed.

With reference to FIGS. 1 and 2, the mounting member 14 is formed from a resilient material, such as sheet steel, for ready securance to the housing 12 in the assembly of the receptacle 10 and thereby suitably to adapt the receptacle 10 for mounting on a support (not shown). The mounting member 14 comprises an elongated collar 108 having mounting ears 110 integral thereto at its opposite extremities. The collar 108 has an expanded middle portion 112 with an opening 114 for receiving a fastener for a face plate (not shown) adapted for placement over the receptacle 10 when the receptacle 10 is mounted. The ears 110 have strain relief slots 116, though not necessarily, and openings 118 for the passage of mounting screws (not shown). Integral, cantilever, inwardly projecting tabs 120 are also provided on the ears 110 so that the mounting member 14 can be readily attached to the housing 12.

Thus far in the description, the structure of the component parts of the receptacle has been set forth. The cooperation between these parts in accordance with the principles of the invention remains to be described. The fully assembled receptacle 10 shown in FIG. 1 consists of the housing 12 with a terminal 16 clamped in each of the piers 18 and the mounting member 14 rigidly secured to the housing. It will become apparent that the housing 12, the terminals 16, and the mounting member 14 are readily assembled to form the receptacle 10.

The order in which assembly is made can be arbitrarily selected. According, for descriptive purposes, the mounting member 14 can first be assembled with the housing 12. Prior to such assembly, the mounting member cantilever tabs 120 desirably are formed at an angle of approximately 45° from the plane of the mounting member 14.

The mounting member 14 is positioned so that the collar 108 is aligned for passage into the channel 20 in the housing 12 in a direction substantially transverse to the elongated dimension of the housing 12 and so that the angled tabs 120 project down and away from the faced portions 22. As the collar 108 is passed into the channel 20, it frictionally slides along and thereby can slightly shave the vertex of the uniform ridges 32 on the side walls 26. As such, slight dimensional tolerance of the mounting member 14 is permissive without impairing the stabilizing function of the ridges 32. Additionally, the cantilever tabs 120, projecting downwardly and inwardly from the ears 110, facilely progress along the tapered portions 38 of the respective end wall ridges 36 and then along the uniform ridge portions 37 with at least some frictional restraint. It should be obvious that the amount of frictional restraint varies qualitatively and inversely as the initial size of the angle which the tabs 120 form with the plane of the mounting member 14.

When the collar 108 is fully inserted in the channel 20, the mounting member 14 is adjacent to the underside of the faced portions 22 and the application of an impulsive force at right angles to the plane of the mounting member 14 to cause the tabs 120 to deflect to an angle smaller than 45°, and thereby in this example to penetrate the ridges 36, respectively, will ensure a durable engagement of the mounting member 14 with the housing 12. It is, however, to be realized that, with a suitable choice of materials for the mounting member 14 and the housing 12, a relatively firm frictional engagement can be achieved by initially forming the tabs 120 at an angle considerably less than 45° from the plane of the mounting member 14. In such an instance, frictional passage of the tabs 120 over the ridges 36 cause the tabs 120 to bend progressively until the mounting member is finally positioned with respect to the housing 12 whereupon a relatively firm frictional engagement arises.

Figure 4:
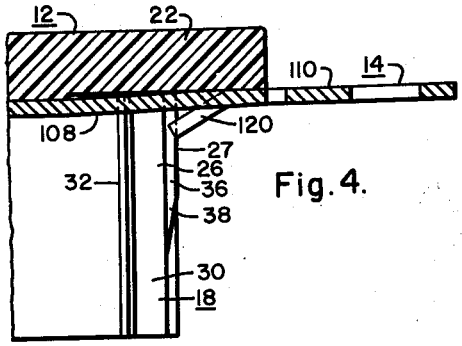
FIG. 4 is a partial, longitudinally sectioned view of the receptacle depicted in FIG. 2 and taken along the reference line IV—IV thereof.

Since the collar 108 will have frictionally engaged the ridges 32 to fit tightly in the channel 20, the mounting member 14 is rigidly held against movement in any direction along the plane of the underside of the faced portions 22. Furthermore, the mounting member 14 is rigidly held against substantially vertical movement transverse to the plane of the faced portions 22 because of the continuing clamping action imposed by the tabs 120 as illustrated in FIG. 4. The inserted mounting member 14, positioned against the underside of the faced portions 22, is obviously restricted from further movement against the faced portions 22. The tabs 120, having been deflected to penetrate the ridges 36, therefore, are braced against the ridges 36 so that when force is applied to the ears 110 to retract vertically the mounting member 14 in the channel 20, the ears 110 swing somewhat circularly causing the tabs 120 to bite more deeply into the ridges 36 thereby rigidly opposing the retracting force. Because the vertex of each of the V-projecting ridges 36 is outermost and is therefore a center of stress concentration, partial breakdown of the ridges 36 by biting action of the tabs 120 is facilitated. The stress relieving slots 116 in the ear 110 can be provided so that the ears 110 will bend about the slots 116 rather than cause the ridges 36 to breakdown totally when excessive forces are exerted on the ears 110.

Figure 5:
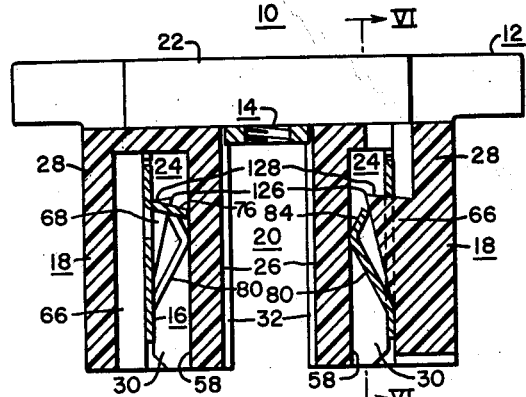
FIG. 5 is a transversely sectioned view taken along the reference line V—V of FIG. 1.
Figure 6:
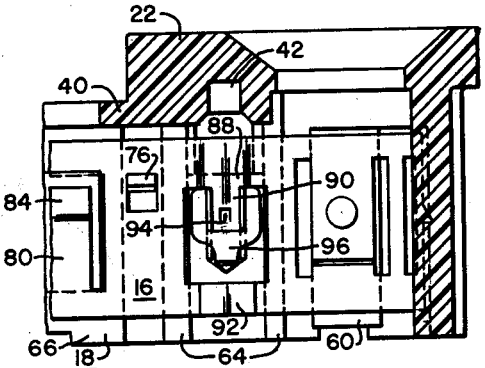
FIG. 6 is a partially sectioned view taken along the reference line VI—VI of FIG. 5.

As illustrated in FIGS. 5 and 6, a terminal 16 can next be inserted in each of the chambers 24 in the housing 12. A clip 96 is first slipped onto each of the terminal lug arms 90 and the terminal 16 is then positioned so that the beams 102 align with the pier end wall ledges 48 and so that an edge 122 of the terminal 16 is leading with the flap elbow 82 aligned with the pier side wall platform 58. As the terminal 16 is inserted in the chamber 24, the tangs 106 slide frictionally along the end walls 30 and cause central portions 124 of the fixed beams 102 to deflect inwardly thereby providing for dimensional variations between the length of the terminals 16 and the length of the chambers 24. Additionally, the locking strip 78 slides upwardly and outwardly along the hook-like projection 68. As a consequence, the strip 78 springs toward the opposite side wall 26, in opposition to reaction from the flap 80 and tabs 76, until the terminal member 16 is fully inserted in the chamber 24, at which time the strip 78 snaps over on an edge 126 of the projection 68 and brushes inwardly and downwardly along a downwardly inclined top surface 128 of the projection 68 to a position against the roof 40 and the terminal supporting platform 66. The terminal 16 is then positively locked in the chamber 24 in a manner which will soon become more apparent.

The terminal locking action is occasioned by a number of mechanical relations that exist between the terminal 16 and the housing 12. Vertical movement of the terminal 16 along the chamber 24 is substantially prevented because the terminal strip 78 is positively hooked over the downwardly inclined surface 128 of the pier projection 68 against the roof 40. Additionally, the sharp edged tangs 106 slightly bite into the end walls 30 to resist vertical movement of the terminal end portions 86 away from their inserted position against the roof ledges 44. Longitudinal movement of the terminal 16 in the chamber 24 is substantially prevented because the tangs 106, having been stressed inwardly by the end walls 30 of the pier 18, cause the fixed beams 102 to be deflected into the slot 104 whereby the beams 102, responding to this deflection, clamp the terminal 16 against the end walls 30.

Horizontal movement of the terminal in a direction substantially transverse to the chamber 24 longitudinal direction is additionally prevented. The end wall ridges 48 and the side wall ridges 60 stress the terminal 16 to create a moment causing the terminal 16 to bow about its center 74 toward the platform 58. The bowing moment on the terminal 16 is opposed and equalized by force reactions from the platform 58 on the terminal center portion 74 to clamp horizontally the terminal 16 in the chamber 24. Specifically, the platform 58 forces the centilever terminal flap 80 toward the opposite side wall platform 66 so that the flap forearm 84 is lodged against the hook-like projection 68. Additionally, reaction by the plaform 58 against the terminal lanced tabs 76 generally presses and thereby stabilizes the terminal central portion 74 against the platform 66 of the opposite side wall 28.

With respect to the operation of the assembled receptacle 10, each terminal 16 is adapted, as previously described, to engage plug prongs and an inserted wire (or wires) and to establish an electrical connection therebetween. Accordingly, each end portion 86 of the terminals 16 is flexed against the side wall ridge 60 so that the cantilever contact tab 98 extends outwardly and downwardly toward the opposite side wall ridge 50. When a plug having two prongs is passed into the receptacle 10 through the faced portion slots 70, each of the prongs frictionally slides between the ridge 50 and the cantilever contact tab 98 in respective piers 18 thereby stressing the tabs 98 inwardly toward the ridges 60. When the plug is fully inserted in the receptacle 10, each cantilever tab 98 responds to the inward stress to clamp the adjacent plug prong against the opposite side wall ridge 50. Retraction of the plug is then resisted by the contact dome-like bumps 100 that engage complementary recesses or openings ordinarily provided in plug prongs.

The wire engaging lugs 88 of the terminals 16 are received in the pockets 62 of the chambers 24. The clip 96, having been slipped onto each of the lug arms 90, is located between the arm 90 and the side wall 28. With full insertion, a leading edge 130 of the clip 96 is stationed adjacently of the pocket ledge 65 and a clip edge 132 is located against the lug arm 90 and between the lug arm tang 94 and the chamber roof 40. The clip 96 then can cooperate with its complementary lug 88 to engage automatically a wire that is passed through the wire guiding strip 92 in to a passage circumscribed by the clip 96 and its complementary lug arm 90.

The wire, upon insertion, deflects the clip relative to the clip edge 130. When the wire is fully inserted so that its leading end is received in the roof recess 42, it is clamped between the clip 96 and the lug arm 90. Any outward pull on the wire causes firmer engagement of the wire by the clip 96 because the clip 96 responds to the pull in tension to press the wire more firmly against the lug arm 90. If, however, it is desired that the wire be withdrawn from engagement, a relatively blunt instrument can be inserted into the pocket 54 to bend a release tab 134 and the adjacent portion of the clip 96 toward the roof 40 of the chamber 24, though not beyond the limiting pier ledge 56. A more thorough description of the principles and structure that relate to the automatic engagement and release of the wire is made in U.S. Patent 2,997,686, issued on August 22, 1961, to S. A. Mason, entitled Quick Wiring Device, and assigned to the present assignee.

In view of the description presented herein, it is obvious that the receptacle 10 is readily assembled from a minimum number of functional parts without the employment of separate securing elements. The mounting member 14 is rapidly attached to the housing 12 which is integrally constructed and the terminals 16 are readily snapped into the piers 18 of the housing 12. Although the bottoms of the piers 18 are open, the terminals 16 are spaced sufficiently therefrom to maintain underwriters' standards of electrical safety. However, if it is desired to close the bottoms of the piers 18 an insulative cover can be provided therefor. A suitable cover for this purpose is disclosed in a second copending application of S. A. Mason, entitled "Wiring Device," filed July 10, 1959, Serial No. 826,218, and assigned to the present assignee.

As previously indicated, the embodiment described here has been set forth only for illustrative purposes. Accordingly, it is desired that the invention be not limited in scope to the described embodiment; rather it is desired that it be accorded an interpretation consistent with the scope and spirit of its broad principles Furthermore, it is to be understood that certain features of the inven-

What is claimed is:

1. A wiring device having suitable mounting means and comprising an insulative housing having at least one elongated rearwardly projecting portion, a generally planar elongated conductive terminal, said projecting portion having an elongated relatively narrow chamber having a rearwardly facing open side for longitudinal edgewise entry of said terminal, means for stabilizing and for locking said terminal relative to said housing including a ridge of said projecting portion extending laterally into said chamber, said stabilizing and locking means also including a forwardly located portion of said terminal being of limited length and being in the plane of said terminal, said terminal portion being deflectable perpendicularly outwardly of the terminal plane so as resiliently to pass over said ridge upon forward insertion of said terminal into said chamber and being latchingly engaged over said ridge so as to preclude rearward withdrawal of said terminal through said open chamber side, and at least one resilient projection struck outwardly from the plane of said terminal, said projection being located in alignment with but rearwardly of said terminal portion in the planar lateral direction of said terminal, said terminal projection further extending generally forwardly as well as planarly outwardly toward said terminal portion but terminating rearwardly thereof, said terminal projection further resiliently engaging an adjacent portion of a chamber wall located oppositely of said ridge so as to aid in inducing and so as to enhance the aforementioned latching relation.

2. A wiring device having suitable mounting means and comprising an insulative housing having at least one elongated rearwardly projecting portion a generally planar elongated conductive terminal, said projecting portion having an elongated relatively narrow chamber having a rearwardly facing open side for longitudinal edgewise entry of said terminal, means for stabilizing and for locking said terminal relative to said housing including a ridge of said projecting portion extending laterally into said chamber, said stabilizing and locking means also including a forwardly located portion of said terminal being of limited length and being in the plane of said terminal, said terminal portion being deflectable perpendicularly outwardly of the terminal plane so as resiliently to pass over said ridge upon insertion of said terminal into said chamber and being latchingly engaged over said ridge so as to preclude rearward withdrawal of said terminal through said open chamber side of said chamber, at least one resilient projection struck outwardly from the plane of said terminal, said projection being located in alignment with but rearwardly of said terminal portion in the planar lateral direction of said terminal, said terminal projection further extending generally forwardly as well as planarly outwardly toward said terminal portion but terminating rearwardly thereof, said terminal projection further and resiliently engaging an adjacent portion of a chamber wall located oppositely of said ridge so as to aid in inducing and so as to enhance the aforementioned latching relation, and another projection struck out from said terminal in proximity to each end of said terminal portion and extending rearwardly from the rearmost extent of said terminal portion to engage said wall for further security of said latching relation.

3. A wiring device having suitable mounting means and comprising an insulative housing having at least one elongated rearwardly projecting portion, a generally planar elongated conductive terminal, said projecting portion having an elongated relatively narrow chamber having a rearwardly facing open side for longitudinal edgewise entry of said terminal, means for stabilizing and for locking said terminal relative to said housing including a ridge of said projecting portion extending laterally into said chamber, said stabilizing and locking means also including a forwardly located portion of said terminal being of limited length and being in the plane of said terminal, said terminal portion being deflectable perpendicularly outwardly of the terminal plane so as resiliently to pass over said ridge upon forward insertion of said terminal into said chamber and being latchingly engaged over said ridge so as to preclude rearward withdrawal of said terminal through said open chamber side, at least one resilient projection struck outwardly from the plane of said terminal, said projection being located in alignment with but rearwardly of said terminal portion in the planar lateral direction of said terminal, said terminal projection further extending generally forwardly as well as planarly outwardly toward said terminal portion but terminating rearwardly thereof, said terminal projection further resiliently engaging an adjacent portion of a chamber wall located oppositely of said ridge so as to aid in inducing and so as to enhance the aforementioned latching relation, and a wire receiving lug being integrally formed on said terminal in a location longitudinally spaced from each end of said terminal portion.

References Cited in the file of this patent

UNITED STATES PATENTS

| | | |
|---|---|---|
| 1,719,363 | Gaynor | July 2, 1929 |
| 1,915,070 | Muldoon | June 20, 1933 |
| 2,031,453 | Benander | Feb. 18, 1936 |
| 2,358,132 | Paucek | Sept. 12, 1944 |
| 2,406,079 | Krueger | Aug. 20, 1946 |
| 2,495,623 | Benander | Jan. 24, 1950 |
| 2,579,841 | Ludwig | Dec. 25, 1951 |
| 2,665,353 | Popp | Jan. 5, 1954 |
| 2,688,123 | Benham et al. | Aug. 31, 1954 |
| 2,701,869 | Hobson | Feb. 8, 1955 |
| 2,723,385 | Benander | Nov. 8, 1955 |
| 2,872,503 | Winter | Feb. 3, 1959 |
| 2,892,178 | Harris | June 23, 1959 |
| 2,914,276 | Antalek et al. | Nov. 24, 1959 |

FOREIGN PATENTS

| | | |
|---|---|---|
| 531,393 | Belgium | Sept. 25, 1954 |
| 468,905 | Canada | Oct. 24, 1950 |